Jan. 13, 1959  W. L. RINGLAND  2,869,007
UNIPOLAR GENERATOR AIR GAP SCAVENGING
Filed Nov. 5, 1956
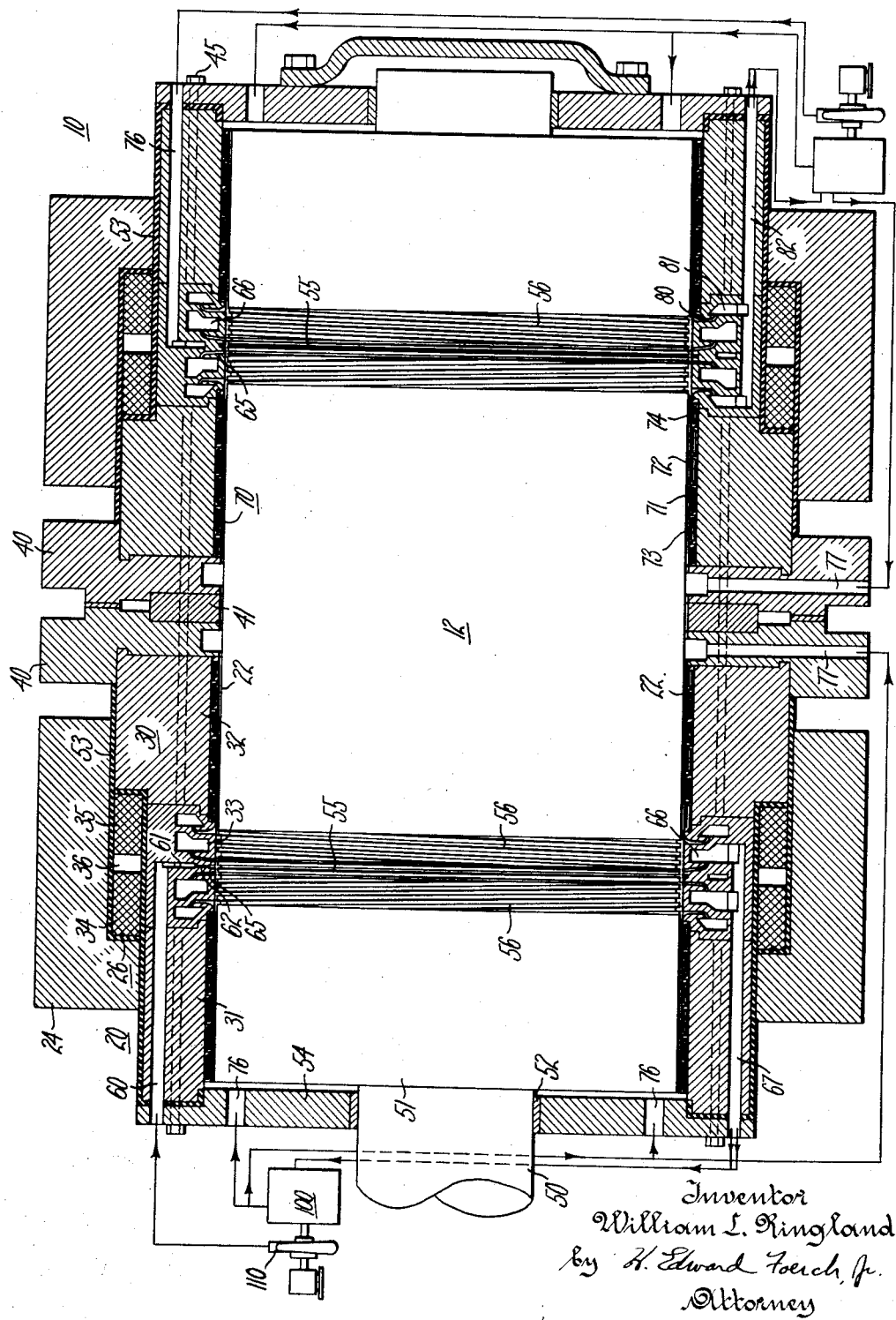
Inventor
William L. Ringland
by H. Edward Foerch, Jr.
Attorney

United States Patent Office 2,869,007
Patented Jan. 13, 1959

2,869,007

UNIPOLAR GENERATOR AIR GAP SCAVENGING

William L. Ringland, West Allis, Wis., assignor to Allis-Chalmers Manufacturing Company, Milwaukee, Wis.

Application November 5, 1956, Serial No. 620,507

4 Claims. (Cl. 310—178)

This invention relates in general to unipolar generators having liquid metal current collectors, and more particularly to unipolar generators having liquid metal current collectors in which the noncurrent collecting portions of the air gap are continuously scavenged of liquid metal.

Electrically conductive liquid metal, such as a sodium potassium alloy, has been found to be an effective current collector means in unipolar generators for conducting the high current between the rotor and the current carrying portions of the stator and the external circuit. Generally, the liquid metal is supplied from external reservoirs to the current collector portions of the air gap through a supply duct; it is distributed around the circumference of the rotor wetting the current collector portions of the surfaces of the rotor and stator for conducting current therebetween, and it is discharged after it has flowed a short distance axially of the air gap and returned to the external reservoirs.

However, if there is not complete discharge from the air gap and liquid metal accumulates in the noncurrent collecting area of the air gap, such liquid metal may short circuit all or a portion of the generated voltage.

Heretofore, helical grooves have been found in the cylindrical surface of the rotor adjacent the current collecting portions of the rotor with the grooves on one side of the ring threaded oppositely to the grooves on the other side so that a predetermined direction of rotation of the armature tends to force the collector fluid axially toward the current collecting region from opposite sides thereof. These grooves effect some pumping or slinging of liquid metal flowing axially outward in the air gap; however, they are relatively ineffectual against suspended vaporized liquid metal caused by the high rotational speed of the rotor.

According to the present invention means are provided for continuously scavenging stray liquid metal from the air gap. These means comprise a continuous flow of inert gas axially toward the current collector portions of the air gap from both sides thereof. The gas is supplied at the ends and at the axial center of the air gap, and it is collected for recirculation by means provided adjacent to the current collector portions of the stationary field member. The gas which is cooled externally of the generator additionally cools the air gap surfaces of the rotor and the field member as it flows along the air gap.

It is therefore an object of this invention to provide a unipolar generator having means for eliminating accumulations of liquid metal in the air gap thereof.

Another object of this invention is to provide a unipolar generator having means for continuously scavenging the air gap thereof of stray liquid metal.

Other objects and advantages will be apparent from the following description taken in connection with the accompanying drawing which illustrates a longitudinal sectional view of a unipolar generator embodying the present invention.

Referring more particularly to the drawing, a dynamoelectric machine 10 is illustrated comprising a rotating armature member 12 and a stationary field structure 20 which cooperates with the armature to define an air gap 22 therebetween.

The field structure or stator 20 comprises two similar units each including an annular yoke 24 having field coil 26 disposed in the recessed portion thereof, and including an electrically conductive sleeve means 30 disposed coaxially with the yokes 24 and coils 26. Each sleeve means 30 includes end portions 31, 32 of magnetic material, such as iron, and an intermediate current collector portion 33 which is of nonmagnetic conductive material, such as aluminum bronze. The magnetic portions 31, 32 of the sleeves serve as the poles for the field structure and are made integral with the current collector portions as by welding. Sleeve means 30 serve as the current carrying members of the field structure 20 for conducting current between the current collector 33 and an external circuit.

The excitation coils 26 are symmetrically located about the current collector portions 33 of the sleeves and comprise two individual coils 34, 35 with a space 36 between the coils. This construction of the coils 26 permits operation of the generator at near rated voltage even with one of the individual coils 34, 35 disconnected, and in addition the construction allows insertion of a probe through a suitable opening in the yoke and the collection portion of the sleeves into contact with the surface of the rotor. Such a probe may be used to measure the electrical potential at the rotor surface with the rotor turning but before the collector portion of the air gap is filled with the collector fluid, or it may be used as a gauge to measure clearance between the rotor and stator members. Splitting of the two elements of coils 26 further permits electrical conductors and fluid ducts to be brought to or from the collector portions of the sleeves through the space between the two coils, if desired.

Annular plates 40 attached to the adjacent ends of the sleeves 30 serve as bus rings for the sleeves. The annular plates or bus rings 40 for both units of the field structure 20 are positioned at the axially adjacent ends of the units and are spaced apart by a ring of insulation 41. The ring of insulation 41 and bus rings 40 cooperate with the two sleeves 30 in joining them as a continuous sleeve. Long nonmagnetic bolts 45 extending through the stator 20 firmly clamp the members of the stator together.

The rotatable armature or rotor 12 comprises a shaft 50 including a cylinder 51 of magnetic material such as iron for the passage of field flux therein. Although rotor 12 is shown as solid, it may of course be milled for installing copper bars for greater conductivity. Shaft 50 is supported at opposite ends of the rotor in suitable bearings 52.

Insulation 53 is provided between the yokes 24 and sleeves 30 and around the coils 26. The end plates 54 and the long bolts are also electrically insulated from the sleeves 30.

The rotor 10 has spaced apart rings 55 which are aligned radially with the current collector portions 33 of the sleeves 30. A suitable electrically conductive liquid metal, such as sodium and potassium alloy, is supplied to the current collector portions of the air gap through passages 62 during operation of the generator. The rotor rings 55 and the current collector portions 33 are wetted by the conductive liquid metal which fills the gap therebetween. The rotor rings, the current collector portions and the conductive fluid serve as current collectors conducting current between the rotor 12 and the sleeves 30 of the field member.

In addition to rotor rings 55, the rotor cylinder has helical grooves 56 in its surface adjacent to the rotor rings 55 and extending a short distance axially on both sides of rotor rings 55. The grooves on one side of a ring are threaded oppositely to the grooves on the other side so that a predetermined direction of rotation of the rotor tends to force the collector fluid axially toward the rotor rings 55 from opposite sides thereof, thus keeping the fluid at the collector area of the air gap.

Means are provided for cooling the collector fluid. Although the collector fluid may be cooled by circulating a cooling fluid through suitable ducts in the collector portions 33, it is preferably cooled by circulation of the collector fluid through external reservoirs 100 and recirculated by external pumps 110. Fluid may be cooled by water tubes in the reservoir or by other suitable means.

The collector fluid is supplied to the current collector portions of the air gap from external reservoirs 100 and pumps 110 by means including supply ducts 60, annular supply reservoirs 61 and inlet ducts 62. The supply ducts may extend from the end plates 54 through the sleeves 31 to the collector portions, as shown, or it may extend through the yoke 24 and between the split coils 26 to the annular supply chambers 61 in the collector portions of the sleeve.

The liquid metal is discharged through the inlet ducts 62 to the current collector portions of the air gap and forms an annular ring wetting the collector surfaces of the rotor at rings 55 and the current collector portions 33 of the sleeves thereby providing an electrical connection between the rotating armature member 12 and the stationary field member 20.

Supply ducts 60 extend from the end plates 54 at both ends of the generator to collector portions 33. Several such ducts may be positioned circumferentially of the stator to supply the annular supply chambers 61 at several points. Likewise, several inlet ducts 62 may be provided for both collectors radially connecting the supply chambers 61 to the air gap 22.

Annular discharge ducts 65 are formed in the collector portion 33 on both sides of and immediately adjacent to the inlet duct 62. These discharge ducts extend radially to connect the air gap 22 to annular discharge reservoirs 66 which are designed to trap collector fluid entering them. Several return ducts 67 may be provided circumferentially of the sleeves 31 and manifolded to the discharge reservoirs 66. Return ducts 67 connect collector discharge reservoirs 66 of the collector portions of both sleeves to the external reservoir 100 and pumps 110 for recirculation. The annular discharge ducts 65 permit annular or 360 degree discharge of fluid from the collector area of the air gap.

Insulation means 70 are provided along the inner surface of the sleeve 30 of the stationary field member 20. This insulation means offers protection against short circuiting between the rotor and the stator in the event liquid metal escapes from the current collector portions of the air gap.

Insulating means 70 may comprise a plurality of rings or bands 71 positioned side by side on the radially inner surface of the sleeves from the end plates 54 to the collector portion 33, and from the collector portions 33 to the annular plates 40. These rings 71 are preferably generally rectangular in cross section to form a substantially continuous cylindrical surface when positioned on the radially inner surface of the sleeves.

The rings 71 include a ring 72 of magnetic material substantially rectangular in cross section. The ring 72 has a coating on the four sides thereof of insulation material 73 which is compatible with the liquid metal.

Suitable means are provided to seal the joints between adjacent annular insulated rings 71. These means may comprise an additional coating of insulation 74 applied over the inner surface of the insulating rings 71.

As the rotor is turning at a relatively high speed, a small amount of the liquid metal vaporizes and some of this liquid metal enters the noncurrent collecting portions of the air gap. Means are provided for returning the collector fluid to the external reservoirs 100 comprising a flow of inert gas along the air gap toward the current collector portions 33. Any gas which does not react chemically with the collector fluid such as nitrogen may be used.

The gas is supplied to the air gap at each end of both sleeves by means of ducts 76 positioned in end pieces 54 and ducts 77 through plates 40 at the center of the stator. The gas flows from the ducts 76 and 77 along the air gap toward the current collector portions 33. Although the gas is shown supplied at the ends and center of the machine, it could be supplied at intermediate positions in the flow path, if desired. However, when the gas is supplied at the ends and midpoint of the rotor, the gas flows along substantially the entire surface of the rotor and thus additionally contributes to the cooling of the rotor.

Means are provided by the collector portions 33 for collecting the gas and any suspended liquid metal carried by the gas. These means comprise annular discharge ducts 80, annular gas discharge reservoirs 81 and return ducts 82. Discharge ducts 80 and discharge reservoirs 81 are provided on both sides of the inlet ducts 62. Liquid metal annular discharge ducts 65 and liquid metal collection reservoirs 66 are intermediate discharge ducts 80 and discharge reservoirs 81. As shown the collector portions 33 extend axially beyond the collector portions 55 of the armature and the gas collection means are located in this extension of the sleeve collector portions.

The annular discharge ducts 80 for gas discharge are constructed in the same manner that annular discharge ducts 65 are constructed. Discharge ducts 80 extend radially from the air gap to provide annular or 360 degree discharge from the air gap for the gas and any liquid metal carried by the gas. The discharge ducts 80 communicat with annular reservoirs 81 along one radially extending side or axially thereof at a desired point intermediate the radial limits of the reservoir to provide a trap for any liquid metal carried by the gas.

Several return ducts 82 may be provided circumferentially of the sleeves 31 and manifolded to the annular collection reservoirs 81 to return the gas and liquid metal to the external reservoirs for recirculation. Return ducts 82 extend axially into the collector portions 33 radially outside of the annular reservoirs 81. Return ducts 82 are connected to the annular reservoirs 66 by a duct 83 extending between the annular reservoirs 81 and the return ducts 82. This arrangement for connecting the annular reservoirs with the external reservoirs permits as many return ducts to be manifolded to the collection reservoirs as desired, or it permits a minimum of one return duct from the two collection reservoirs of each current collector portion.

Rotation of the rotor, in conjunction with the radial annuli 80 has been found to produce sufficient gas flow for scavenging purposes without a separate gas blower, although a blower could be added to the gas circulating sytem, if desired.

Separation of liquid metal entrained in the gas is accomplished in reservoir 100, by gravity, condensation, or other known separating means.

At rotor standstill the collector fluid returns through drain ducts to an external reservoir. A suitable source of direct current, not shown, is connected to the field coils to energize the coils to produce uniform radial magnetic field in the air gap. The adjacent poles of the independent field structures have the same polarity. The rotor shaft is rotated by suitable known means. Liquid metal is circulated by means of an external pump through ducts 60, annular supply reservoirs 61 and inlet ducts 62 to the current collector portions of the air gap. The liquid metal is distributed to the current collector portions of the air gap where the fluid conducts current between the rotor rings 55 and the sleeves 30 of the stator.

The flow of the current in the sleeves 30 is in an axial direction and is opposite the direction of flow of the current in the armature. The cross flux produced by the current in the sleeves reduces the cross flux produced by the current in the armature thereby keeping magnetic saturation and losses to a minimum. The two collectors connect the armatures for the two fields in series; the voltages generated are in series relation and therefore double voltage is obtained.

The air gap other than the current collector portions is continuously swept free of stray liquid metal by the flow of gas axially along the air gap from both ends and from the center of the air gap toward the respective current collector portions. The noncurrent collecting portions of the air gap are thus continuously scavenged of liquid metal and the flow of cooled gas additionally cools the air gap surfaces of the generator.

Other variations or modifications may be made in the embodiments of the invention shown by one skilled in the art without departing from the spirit of the invention or from the scope of the appended claims.

What is claimed is:

1. A unipolar generator comprising a rotatable armature member having spaced current collector portions, an annular stationary field member including electrically conductive sleeves cooperating with said armature to form an air gap therebetween, said sleeves having current collector portions radially aligned with said armature current collector portions, means circulating an electrically conductive liquid metal to and from current collector portions of said air gap between said armature current collector portions and said sleeve current collector portions for conducting current therebetween, and means continuously scavenging liquid metal from said air gap other than said current collector portions thereof.

2. A unipolar generator comprising a rotatable armature member having spaced current collector portions, an annular stationary field member including electrically conductive sleeves cooperating with said armature to form an air gap therebetween, said sleeves having a current collector portions radially aligned with said armature currrent collector portions, means circulating an electrically conductive liquid metal to and from current collector portions of said air gap between said armature current collector portions and said sleeve current collector portions for conducting current therebetween, and means comprising an inert gas continuously scavenging liquid metal from said air gap other than said current collector portions, said scavenging means returning said liquid metal to said circulating means.

3. A unipolar generator comprising a rotatable armature member having current collector portions, an annular stationary field member including electrically conductive sleeves cooperating with said armature to form an air gap therebetween, said sleeves having current collector portions radially aligned with said armature current collector portions, means circulating an electrically conductive liquid metal to and from current collector portions of said air gap between said armature portions and said sleeve current collector portions for conducting current therebetween, means supplying an inert gas to said air gap on both sides axially of said currrent collector portions and causing said inert gas to flow axially toward said current collector portions to continuously scavenge liquid metal from said air gap other than said current collector portions.

4. A unipolar generator comprising a rotatable cylindrical armature member having spaced annular current collector portions, an annular stationary field member including electrically conductive sleeves cooperating with said armature member to form an air gap therebetween, said sleeves having annular current collector portions intermediate the ends therefrom and radially aligned with said armature current collector portions, means circulating an electrically conductive liquid metal to and from current collector portions of said air gap between said armature current collector portions and said sleeve current collector portions for conducting current therebetween, means continuously supplying cooled inert gas to said air gap at the ends of said sleeves and causing said inert gas to flow axially toward said current collector portions whereby said inert gas continuously scavenges said air gap other than said current collector portions of liquid metal and cools the surfaces forming said air gap, and means receiving said inert gas at said current collector portions and returning said inert gas to said supply means and said liquid metal to said circulating means.

References Cited in the file of this patent

UNITED STATES PATENTS

| | | |
|---|---|---|
| 1,443,644 | Nobuhara | Jan. 30, 1923 |
| 2,588,466 | Barnes | Mar. 11, 1952 |
| 2,753,476 | Watt | July 3, 1956 |
| 2,786,155 | Sellers | Mar. 19, 1957 |